United States Patent
Hong et al.

(10) Patent No.: US 8,509,697 B2
(45) Date of Patent: Aug. 13, 2013

(54) APPARATUS AND METHOD FOR CONTROLLING UPLINK INTERFERENCE IN A WIRELESS COMMUNICATION SYSTEM

(75) Inventors: Ki-Seob Hong, Suwon-si (KR); Byung-Chan Ahn, Seoul (KR); Hyun-Woo Lee, Seoul (KR); Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 13/043,260

(22) Filed: Mar. 8, 2011

(65) Prior Publication Data
US 2011/0218002 A1    Sep. 8, 2011

(30) Foreign Application Priority Data
Mar. 8, 2010    (KR) .................. 10-2010-0020247

(51) Int. Cl.
*H04B 1/00*    (2006.01)
*H04B 15/00*    (2006.01)

(52) U.S. Cl.
USPC .............................. 455/63.1; 455/69; 455/501

(58) Field of Classification Search
USPC .......................................... 455/63.1, 69, 501
See application file for complete search history.

(56) References Cited

U.S. PATENT DOCUMENTS
2010/0099449 A1*    4/2010    Borran et al. ................. 455/501

\* cited by examiner

*Primary Examiner* — Tuan H Nguyen

(57) ABSTRACT

An apparatus and a method for controlling uplink interference in a wireless communication system. The method for controlling the uplink interference includes determining at least one interference signal power threshold determined by at least one neighbor Base Station (BS). The method also includes determining a transmit power offset for at least one serviced Mobile Station (MS) using the at least one interference signal power threshold. The method further includes sending the transmit power offset for the at least one MS to the at least one MS.

18 Claims, 6 Drawing Sheets

APPARATUS AND METHOD FOR CONTROLLING UPLINK INTERFERENCE IN A WIRELESS COMMUNICATION SYSTEM

CROSS-REFERENCE TO RELATED APPLICATION(S) AND CLAIM OF PRIORITY

The present application is related to and claims priority under 35 U.S.C. §119(a) to a Korean patent application filed in the Korean Intellectual Property Office on Mar. 8, 2010, and assigned Serial No. 10-2010-0020247, the entire disclosure of which is hereby incorporated by reference.

TECHNICAL FIELD OF THE INVENTION

The present invention relates generally to an apparatus and a method for controlling uplink interference in a wireless communication system. More particularly, the present invention relates to an apparatus and a method for controlling uplink interference by sharing information between base stations in the wireless communication system.

BACKGROUND OF THE INVENTION

Research is currently being conducted on $4^{th}$ Generation (4G) communication systems to provide users with services of various Quality of Service (QoS) levels at a high data rate. In particular, the 4 G communication systems are developed to support high speed services by ensuring mobility and QoS in Broadband Wireless Access (BWA) communication systems. A representative 4 G communication system is Institute of Electrical and Electronics Engineers (IEEE) 802.16 communication system.

The IEEE 802.16 communication system is a communication system adopting Orthogonal Frequency Division Multiplexing (OFDM)/Orthogonal Frequency Division Multiple Access (OFDMA) scheme.

In the OFDM/OFDMA communication system, an uplink signal of a mobile station does not act as interference to a serving base station, but interferes with a neighbor base station. In this regard, a method for controlling the uplink interference in the communication system is needed.

SUMMARY OF THE INVENTION

To address the above-discussed deficiencies of the prior art, it is a primary aspect of the present invention to provide an apparatus and a method for controlling uplink interference in a wireless communication system.

Another aspect of the present invention is to provide an apparatus and a method of a base station for controlling a transmit power of a mobile station by considering uplink interference in a wireless communication system.

Another aspect of the present invention is to provide an apparatus and a method of a base station for controlling a transmit power of a mobile station by considering a transmit power threshold of the mobile station received from a neighbor base station in a wireless communication system.

Another aspect of the present invention is to provide an apparatus and a method of a base station for sending a transmit power threshold of an interfering mobile station determined based on interference, to a neighbor base station in a wireless communication system.

According to one aspect of the present invention, a method for controlling uplink interference at a Base Station (BS) in a wireless communication system is provided. The method includes determining at least one interference signal power threshold determined by at least one neighbor BS. The method also includes determining a transmit power offset for at least one serviced Mobile Station (MS) using the at least one interference signal power threshold. The method further includes sending the transmit power offset for the at least one MS to the at least one MS.

According to another aspect of the present invention, an apparatus for controlling uplink interference at a BS in a wireless communication system is provided. The apparatus includes an interface configured to communicate with at least one neighbor BS and a receiver configured to receive a signal from an MS. The apparatus also includes a controller configured to determine a transmit power offset for at least one serviced MS using an interference signal power threshold determined by at least one neighbor BS and provided through the interface. The apparatus further includes a transmitter configured to send the transmit power offset for the at least one MS determined by the controller, to the at least one MS.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention provide a technique for controlling uplink interference by sharing information between base stations in a wireless communication system.

Figure 1:
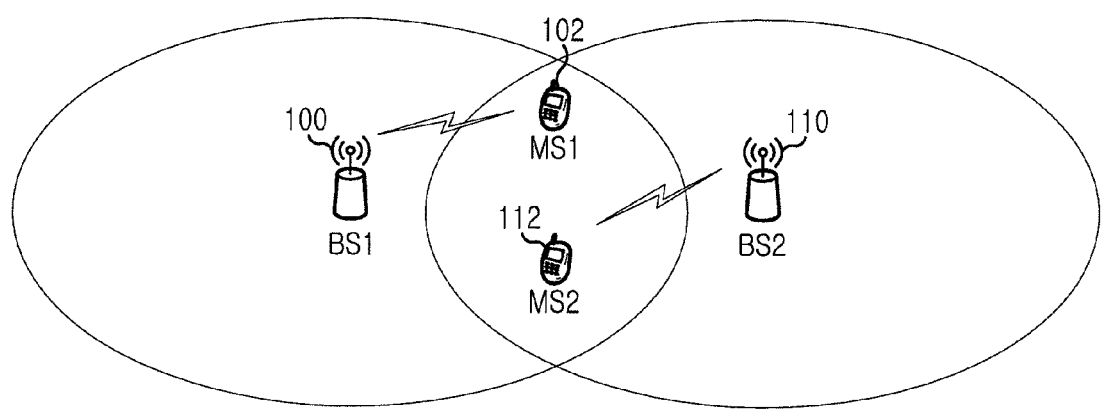
FIG. 1 illustrates a wireless communication system according to an embodiment of the present invention.

FIG. 1 illustrates a wireless communication system according to an embodiment of the present invention.

The wireless communication system of FIG. 1 includes a first Base Station (BS) 100, a second BS 110, a first Mobile Station (MS) 102, and a second MS 112.

The first MS 102 travels in a service coverage of the first BS 100 and is serviced by the first BS 100. The second MS 112 travels in a service coverage of the second BS 110 and is serviced by the second BS 110.

An uplink signal of the first MS 102 can act as interference to the second BS 110, and an uplink signal of the second MS 112 can act as interference to the first BS 100. Thus, to mitigate the interference, the first BS 100 and the second BS 110 share threshold information of an interference signal power. For example, the first BS 100 shares the threshold information of the interference signal power determined by considering its interference, with the second BS 110. The second BS 110 shares the threshold information of the interference signal power determined by considering its interference, with the first BS 100. Herein, the first BS 100 and the second BS 110 share the information over a backhaul.

To reduce the uplink interference from the first MS 102, the first BS 100 determines a transmit power of the first MS 102 by considering the threshold of the interference signal power provided from the second BS 110.

To reduce the uplink interference from the second MS 112, the second BS 110 determines a transmit power of the second MS 112 by considering the threshold information of the interference signal power provided from the first BS 100.

As stated earlier, the first BS 100 and the second BS 110 control the uplink interference by considering the threshold of the interference signal power shared. The first BS 100 and the second BS 110 can operate as shown in FIG. 2.

Figure 2:
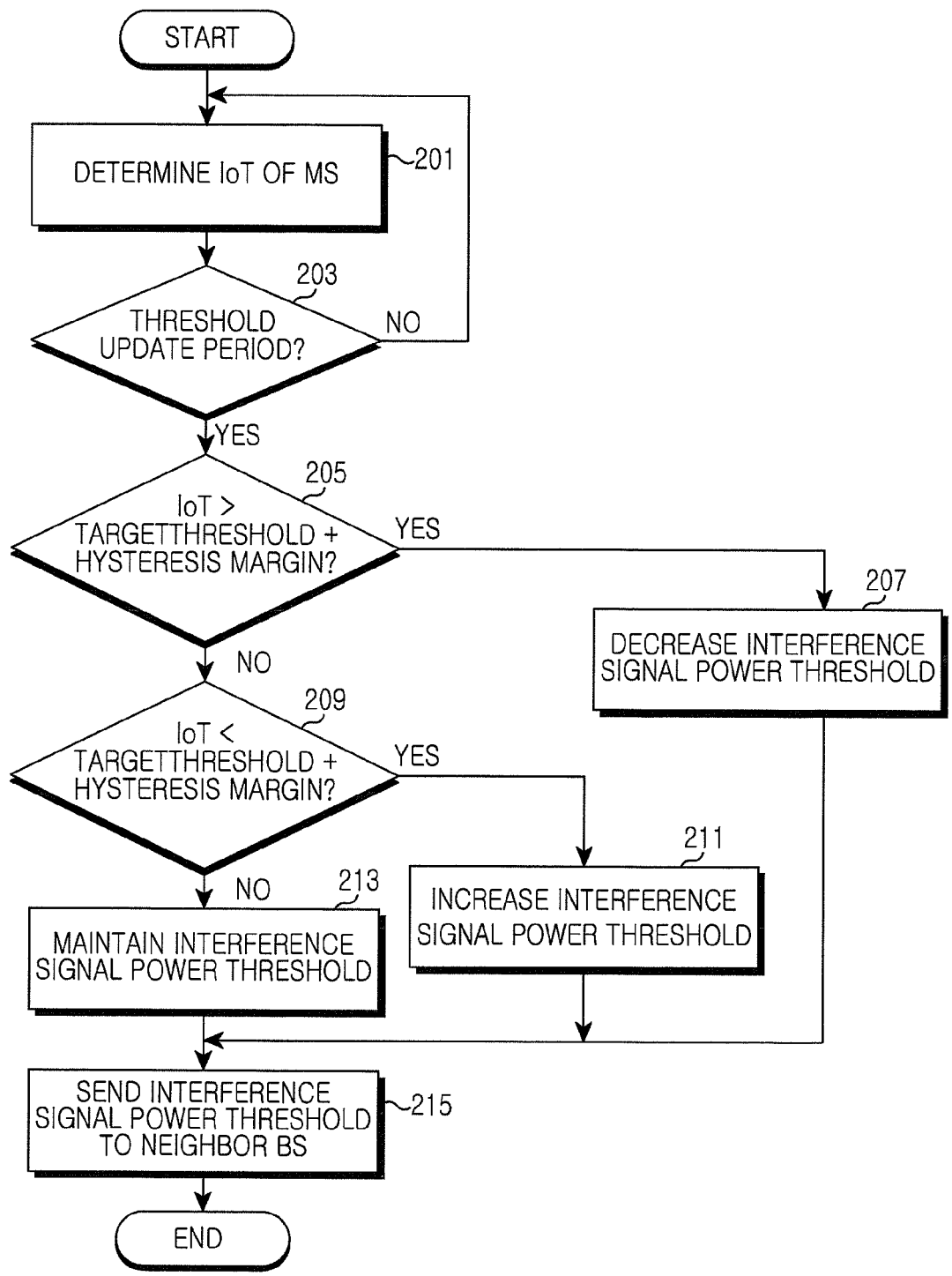
FIG. 2 illustrates a method of a base station for determining a transmit power threshold of a mobile station in the wireless communication system according to an embodiment of the present invention.

FIG. 2 illustrates a method of the BS for determining a transmit power threshold of the MS in the wireless communication system according to an embodiment of the present invention.

The BS measures Interference over Thermal (IoT) using a received signal in step 201. For example, the BS measures the IoT defined according to Equation 1 by demodulating the received signal.

$$IoT = \frac{I_{OC} + N_O}{N_O} \quad [\text{Eqn. 1}]$$

IoT denotes a thermal noise interference, $I_{OC}$ denotes a receive power of the interference caused by an interfering MS, and $N_O$ denotes a thermal-noise power caused by the interfering MS.

In step 203, the BS determines whether a threshold update period arrives.

When the threshold update period does not arrive, the BS measures the IoT in step 201. The BS periodically measures the IoT. For example, when the threshold update period does not arrive, the BS may finish this process.

When the threshold update period arrives, the BS determines whether the IoT satisfies a condition for reducing the interference signal power threshold in step 205. For example, to determine whether the condition for reducing the interference signal power threshold is satisfied, the BS compares the measured IoT with a first reference value. Herein, the first reference value is determined to a sum of an IoT target threshold and an IoT hysteresis margin.

When the IoT is greater than the first reference value, the BS recognizes that the condition for reducing the interference signal power threshold is satisfied. Hence, the BS decreases the interference signal power threshold in step 207. For example, the BS reduces the interference signal power threshold by a reference decrease size based on Equation 2.

$$UserRxPowerThreshold = \text{MAX}\begin{pmatrix} UserRxPowerThresold - \\ UserRxPowerThresholdDown, \\ MinUserRxPowerThreshold \end{pmatrix} \quad [\text{Eqn. 2}]$$

In Equation 2, UserRxPowerThreshold denotes the interference signal power threshold of the BS, UserRxPowerThresholdDown denotes the reference decrease size, and MinUserRxPowerThreshold denotes a minimum interference signal power threshold.

Based on Equation 2, the BS lowers the interference signal power threshold so that the interference signal power threshold is not smaller than the minimum interference signal power threshold.

In step 215, the BS sends the interference signal power threshold determined in step 207 to a neighbor BS. For example, the BS sends the interference signal power threshold determined in step 207 to the neighbor BS over the backhaul.

When the IoT is smaller than or equal to the first reference value in step 205, the BS recognizes that the condition for reducing the interference signal power threshold is not satisfied. In step 209, the BS determines whether the IoT satisfies a condition for increasing the interference signal power threshold. For example, to determine whether the condition for increasing the interference signal power threshold is satisfied, the BS compares the measured IoT with a second reference value. Herein, the second reference value is determined to a difference of the IoT target threshold and the IoT hysteresis margin.

When the IoT is smaller than the second reference value, the BS recognizes that the condition for increasing the interference signal power threshold is satisfied. Thus, the BS increases the interference signal power threshold in step 211. For example, based on Equation 3, the BS increases the interference signal power threshold by a reference increase size.

$$UserRxPowerThreshold = \quad \text{[Eqn. 3]}$$
$$\text{MIN}\begin{pmatrix} UserRxPowerThresold + UserRxPowerThresholdUp, \\ MinUserRxPowerThreshold \end{pmatrix}$$

In Equation 3, UserRxPowerThreshold denotes the interference signal power threshold of the BS, UserRxPowerThresholdUp denotes the threshold increase size, and MaxUserRxPowerThreshold denotes a maximum interference signal power threshold.

Based on Equation 3, the BS increases the interference signal power threshold so that the interference signal power threshold does not exceed the maximum interference signal power threshold.

In step 215, the BS sends the interference signal power threshold determined in step 211 to the neighbor BS. For example, the BS sends the interference signal power threshold determined in step 211 to the neighbor BS over the backhaul.

When the IoT is greater than or equal to the second reference value in step 209, the BS recognizes that the condition for increasing the interference signal power threshold is not satisfied. Hence, the BS does not change the interference signal power threshold in step 213.

In step 215, the BS sends the interference signal power threshold determined in step 213 to the neighbor BS. For example, the BS sends the interference signal power threshold determined in step 213 to the neighbor BS over the backhaul.

Next, the BS finishes this process.

In this embodiment, the BS sends the interference signal power threshold to the neighbor BS even when the interference signal power threshold is not changed. Alternatively, when the interference signal power threshold is not changed, the BS may not send the interference signal power threshold to the neighbor BS. Alternatively, when the interference signal power threshold is not changed, the BS may send interference signal power threshold maintenance information to the neighbor BS.

Now, a method of a serving BS for controlling the uplink interference using the interference signal power threshold provided from the neighbor BS is explained. That is, to mitigate the uplink interference, the serving BS determines the transmit power of the MS using the interference signal power threshold provided from the neighbor BS as shown in FIG. 3.

Figure 3A:
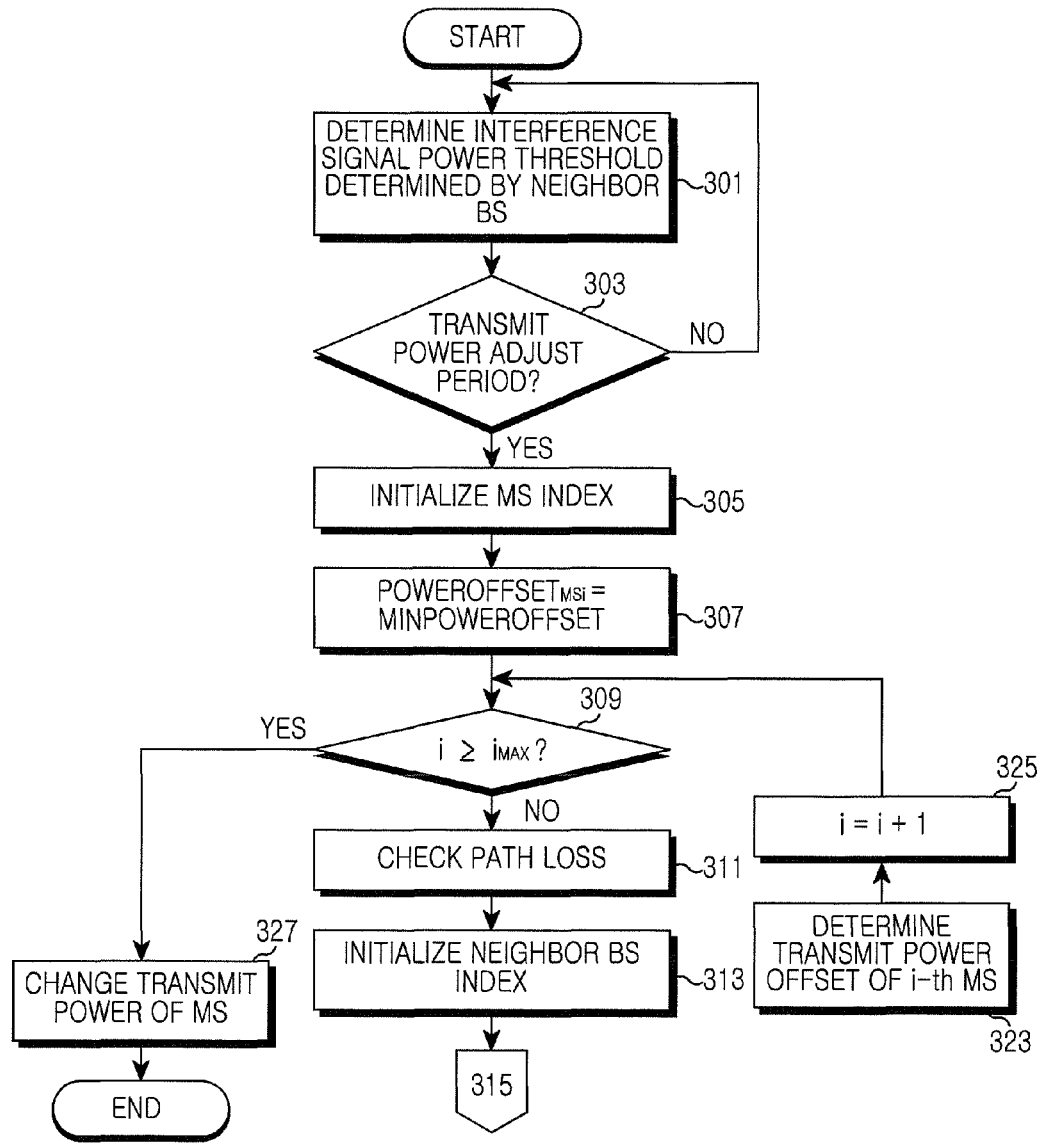
FIGS. 3A and 3B illustrate a method of the base station for controlling a transmit power of the mobile station by considering uplink interference in the wireless communication system according to an embodiment of the present invention.
Figure 3B:
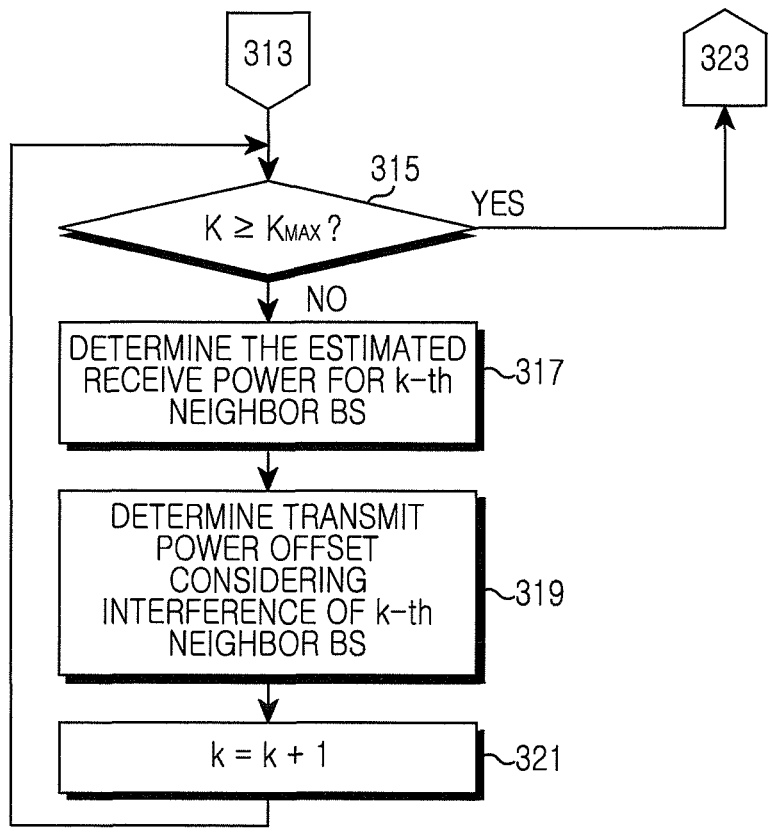

FIGS. 3A and 3B illustrate a method of the BS for controlling the transmit power of the MS by considering the uplink interference in the wireless communication system according to an embodiment of the present invention.

In step 301, the BS determines the interference signal power threshold determined by the neighbor BS. For example, the BS receives the interference signal power threshold of the neighbor BS over the backhaul. Herein, the neighbor BS determines the interference signal power threshold using the method of FIG. 2.

In step 303, the BS determines whether a transmit power adjust period of the MS arrives.

When the transmit power adjust period of the MS does not arrive, the BS determines the interference signal power threshold determined by the neighbor BS in step 301. For example, when the transmit power adjust period of the MS does not arrive, the BS may finish this process.

When the transmit power adjust period of the MS arrives, the BS initializes an MS index i in step 305. Herein, the MS index indicates an index for indicating the MS to be serviced by the BS.

In step 307, the BS sets a transmit power offset of the i-th MS to a minimum transmit power offset. Herein, the minimum transmit power offset can be changed according to the current transmit power of the MS. For example, when the interference of the MS on the neighbor BS falls below a reference interference, the minimum power transmit offset is determined to raise the transmit power of the MS. For example, when the interference of the MS on the neighbor BS exceeds the reference interference, the minimum power transmit offset is determined to reduce the transmit power of the MS.

In step 309, the BS determines whether the transmit power offset is determined for every MS serviced. The BS compares the MS index i with a maximum MS index $i_{MAX}$. Herein, the maximum MS index is equal to the total number of MSs serviced by the BS.

When the MS index i is smaller than the maximum MS index $i_{MAX}$, the BS recognizes that the transmit power offset is not determined for every serviced MS. Hence, the BS determines path loss for the i-th MS in step 311. In detail, the BS determines the path loss $Pathloss_{MS_i\ for\ SBS}$ between the i-th MS and the serving BS and the path loss $Pathloss_{MS_i\ for\ NBS}$ between the i-th MS and the neighbor BS. For instance, the BS determines the path loss $Pathloss_{MS_i\ for\ SBS}$ between the i-th MS and the serving BS based on Equation 4. The BS determines the path loss $Pathloss_{MS_i\ for\ NBS}$ between the i-th MS and the neighbor BS based on Equation 5. Herein, the serving BS represents the BS which services the i-th MS.

$$Pathloss_{MS_i\ for\ SBS} = \frac{BSTxPower_{SBS}}{RSSI_{MS_i\ for\ SBS}} \quad \text{[Eqn. 4]}$$

In Equation 4, $Pathloss_{MS_i\ for\ SBS}$ denotes the path loss between the i-th MS and the serving BS, $BSTxPower_{SBS}$ denotes the transmit power of the serving BS, and $RSSI_{MS_i\ for\ SBS}$ denotes a downlink signal strength received at the i-th MS from the serving BS. Herein, the BS receives the $RSSI_{MS_i\ for\ SBS}$ information from the i-th MS.

$$Pathloss_{MS_i\ for\ NBS} = \frac{BSTxPower_{NBS}}{RSSI_{MS_i\ for\ NBS}} \quad \text{[Eqn. 5]}$$

In Equation 5, $Pathloss_{MS_i\ for\ NBS}$ denotes the path loss between the i-th MS and the neighbor BS, $BSTxPower_{NBS}$ denotes the transmit power of the neighbor BS, and $RSSI_{MS_i\ for\ NBS}$ denotes a downlink signal strength received at the i-th MS from the neighbor BS. Herein, the BS receives the $RSSI_{MS_i\ for\ NBS}$ information from the i-th MS, and $BSTxPower_{NBS}$ from the neighbor BS.

After determining the path loss of the i-th MS in step 311, the BS initializes a neighbor BS index k in step 313. Herein, the neighbor BS index is the index indicating the neighbor BS of the i-th MS, except for the serving BS.

In step 315, the BS determines whether the transmit power offset of the i-th MS is determined by considering every neighbor BS of the i-th MS. The BS compares the neighbor BS index k with a maximum neighbor BS index $k_{MAX}$. Herein, the maximum neighbor BS index is equal to the total number of neighbor BSs around the i-th MS.

When the neighbor BS index k is smaller than the maximum neighbor BS index $k_{MAX}$, the BS recognizes that every neighbor BS of the i-th MS is not considered to determine the transmit power offset of the i-th MS. Thus, the BS predicts a receive power of the k-th neighbor BS in step 317. For example, the BS predicts the receive power of the k-th neighbor BS based on Equation 6 or Equation 7. Herein, the receive power of the k-th neighbor BS indicates the signal strength received at the k-th neighbor BS from the i-th MS.

$$UserRxpowerEst_{MS_i\ for\ NBS_k} = \frac{ULTxPower_{MS_i}}{Pathloss_{MS_i\ for\ NBS_k}} \quad [\text{Eqn. 6}]$$

In Equation 6, $UserRxpowerEst_{MS_i\ for\ NBS_k}$ denotes the receive power estimation value of the k-th neighbor BS, $ULTxPower_{MS_i}$ denotes the transmit power of the i-th MS, and $Pathloss_{MS_i\ for\ NBS_k}$ denotes the path loss between the i-th MS and the k-th neighbor BS.

$$UserRxpowerEst_{MS_i\ for\ NBS_k} = \frac{\frac{ULCINR_{MS_i\ at\ SBS} \times (I_{OC\ at\ SBS} + N_{OC\ at\ SBS})}{Pathloss_{MS_i\ for\ NBS_k}}}{Pathloss_{MS_i\ for\ SBS}} \quad [\text{Eqn. 7}]$$

In Equation 7, $UserRxpowerEst_{MS_i\ for\ NBS_k}$ denotes the receive power estimation value of the k-th neighbor BS, $ULCINR_{MS_i\ at\ SBS}$ denotes an uplink Carrier to Interference and Noise Ratio (CINR) of the serving BS, $I_{OC\ at\ SBS}$ denotes the receive power of the interference caused to the serving BS by the interfering MS, $N_{OC\ at\ SBS}$ denotes the thermal-noise power of the interference caused to the serving BS by the interfering MS, $Pathloss_{MS_i\ for\ NBS_k}$ denotes the path loss between the i-th MS and the k-th neighbor BS, and $Pathloss_{MS_i\ for\ SBS}$ denotes the path loss between the i-th MS and the serving BS.

After predicting the receive power of the k-th neighbor BS in step 317, the BS determines the transmit power offset of the i-th MS by considering the interference of the k-th neighbor BS in step 319. For example, the BS determines the transmit power offset of the i-th MS by taking account of the interference of the k-th neighbor BS using the receive power estimation value of the k-th neighbor BS and the interference signal power threshold determined by the k-th neighbor BS based on Equation 8.

$$NewPowerOffset_{MS_i\ for\ SBS_k} = UserRxPowerEst_{MS_i\ for\ SBS_k} - RxPowerThreshold_{NBS_k} \quad [\text{Eqn. 8}]$$

In Equation 8, $NewPowerOffset_{MS_i\ for\ NBS_k}$ denotes the transmit power offset of the i-th MS determined by considering the interference of the k-th neighbor BS, $UserRxPowerEst_{MS_i\ for\ NBS_k}$ denotes the receive power estimation value of the k-th neighbor BS determined based on Equation 6 or Equation 7, and $RxPowerThreshold_{NBS_k}$ denotes the interference signal power threshold determined by the k-th neighbor BS.

After determining the transmit power offset of the i-th MS based on Equation 8, the BS determines the transmit power offset of the i-th MS based on Equation 9 so that the transmit power offset of the i-th MS does not fall below the minimum transmit power offset.

$$PowerOffset_{MS_i} = MAX(PowerOffset_{MS_i}, NewPowerOffset_{MS_i\ for\ SBS_k}) \quad [\text{Eqn. 9}]$$

In Equation 9, $PowerOffset_{MS_i}$ denotes the transmit power offset of the i-th MS, and $NewPowerOffset_{MS_i\ for\ NBS_k}$ denotes the transmit power offset of the i-th MS determined by considering the interference for the k-th neighbor BS.

After determining the transmit power offset of the i-th MS by considering the interference for the k-th neighbor BS in step 319, the BS updates the neighbor BS index (k=k+1) in step 321.

Next, the BS determines whether the transmit power offset of the i-th MS is determined by considering every neighbor BS of the i-th MS in step 315. The BS compares the neighbor BS index k updated in step 321 with the maximum neighbor BS index $k_{MAX}$.

When the neighbor BS index k is greater than or equal to the maximum neighbor BS index $k_{MAX}$ in step 315, the BS recognizes that every neighbor BS of the i-th MS is considered to determine the transmit power offset of the i-th MS. In step 323, the BS determines the transmit power offset of the i-th MS. For example, the BS determines the transmit power offset of the i-th MS such that the transmit power offset of the i-th MS does not exceed the maximum transmit power offset based on Equation 10.

$$PowerOffset_{MS_i} = MIN(PowerOffset_{MS_i}, MaxPowerOffset) \quad [\text{Eqn. 10}]$$

In Equation 10, $PowerOffset_{MS_i}$ denotes the transmit power offset of the i-th MS, and MaxPowerOffset denotes the maximum transmit power offset. $PowerOffset_{MS_i}$ includes the maximum or minimum transmit power offset of the transmit power offsets considering the interference of every neighbor BS of the i-th MS.

After determining the transmit power offset of the i-th MS in step 323, the BS updates the MS index i (i=i+1) in step 325.

Next, the BS sets the transmit power offset of the MS corresponding to the MS index i updated in step 325, as the minimum transmit power offset in step 307.

When the MS index i is greater than or equal to the maximum MS index $i_{MAX}$ in step 309, the BS recognizes that the transmit power offset is determined for every serviced MS. Accordingly, the BS changes the transmit power of the serviced MSs according to the transmit power offset for each MS in step 327. For example, the BS determines the transmit power offset of the MS by subtracting the transmit power offset determined in step 323 from an accumulated transmit power offset for the MS based on Equation 11.

$$TxPowerAdjust_{MS_i} = AccumulatedPowerOffset_{MS_i} - PowerOffset_{MS_i} \quad [\text{Eqn. 11}]$$

In Equation 11, $TxPowerAdjust_{MS_i}$ denotes the transmit power offset of the i-th MS, $AccumulatedPowerOffset_{MS_i}$ denotes the accumulated transmit power offset of the i-th MS, and $PowerOffset_{MS_i}$ denotes the transmit power offset of the i-th MS determined in step 323.

Next, the BS sends the transmit power offset $TxPowerAdjust_{MS_i}$ determined based on Equation 11, to the corresponding MS so that the MS can change the transmit power.

Alternatively, the BS limits the available transmit power of the MS with the transmit power offset determined in step 323 based on Equation 12.

$$AvailableTxPower_{MS_i} = MaxMSTxPower_{MS_i} - NormalizedULTxPower_{MS_i} - PowerOffset_{MS_i} \quad [\text{Eqn. 12}]$$

In Equation 12, $AvailableTxPower_{MS_i}$ denotes the available transmit power of the i-th MS, $MaxMSTxPower_{MS_i}$ denotes the maximum transmit power of the i-th MS, $NormalizedULTxPower_{MS_i}$ denotes a normalized transmit power for the i-th MS, and $PowerOffset_{MS_i}$ denotes the transmit power offset of the i-th MS determined in step 323. Herein, $MaxMSTxPower_{MS_i} - NormalizedULTxPower_{MS_i}$ represents the available power when the MS sends the uplink signal.

Next, the BS transmits the available transmit power information of the MS limited based on Equation 12, to the corresponding MS so that the MS can change the transmit power.

Next, the BS finishes this process.

Following descriptions provide a structure of the BS for determining the interference signal power threshold and adjusting the transmit power of the MS according to the interference signal threshold at the neighbor BS.

Figure 4:
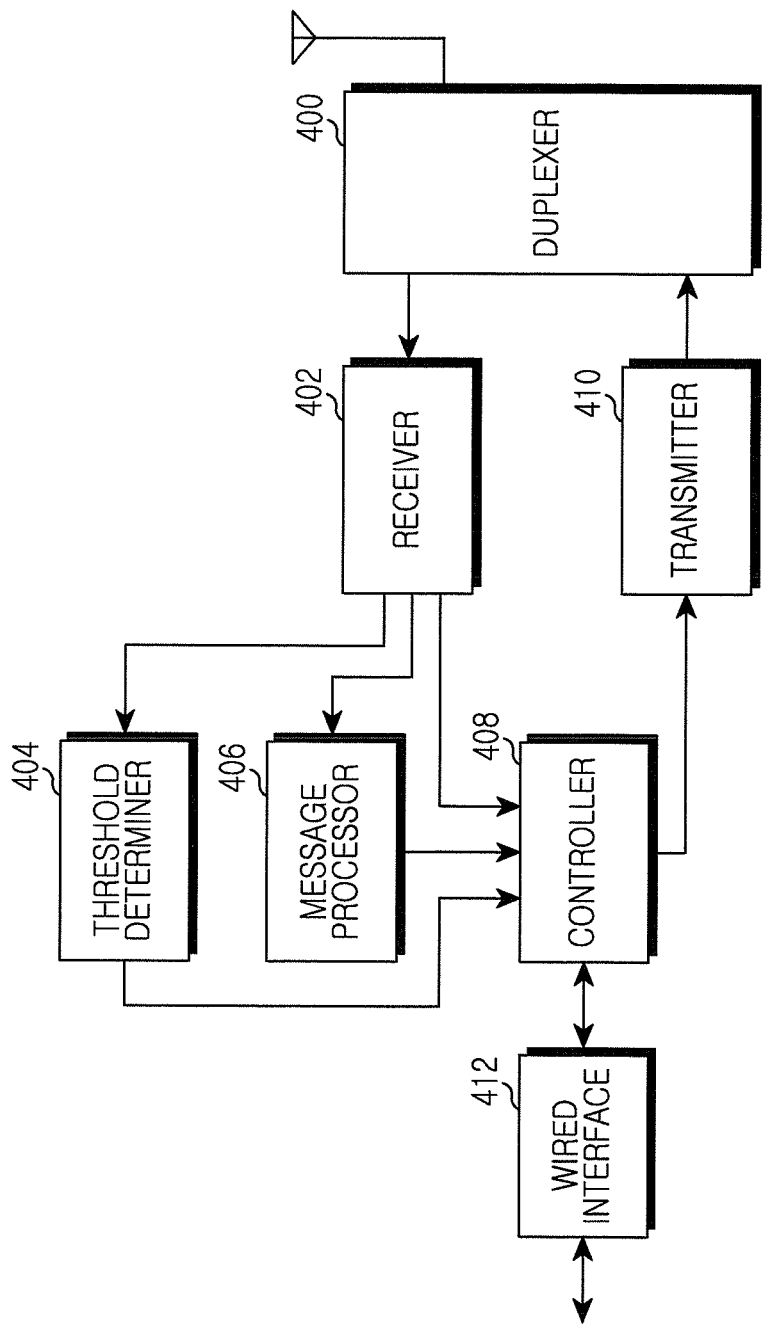
FIG. 4 illustrates the base station in the wireless communication system according to an embodiment of the present invention.

FIG. 4 is a block diagram of the BS in the wireless communication system according to an embodiment of the present invention.

The BS of FIG. 4 includes a duplexer 400, a receiver 402, a threshold determiner 404, a message processor 406, a controller 408, a transmitter 410, and a wired interface 412.

The duplexer 400 sends a transmit signal output from the transmitter 410 over an antenna, and provides a receive signal from the antenna to the receiver 402 according to the duplexing scheme.

The receiver 402 demodulates a Radio Frequency (RF) signal fed from the duplexer 400 to a baseband signal. The receiver 402 can include an RF processing block, a demodulating block, a channel decoding block, and so on. Herein, the RF processing block converts the RF signal output from the duplexer 400 to the baseband signal. The demodulating block includes a Fast Fourier Transform (BIM operator for extracting data from subcarriers of the signal output from the RF processing block. The channel decoding block includes a demodulator, a deinterleaver, and a channel decoder.

The threshold determiner 404 sets the interference signal power threshold by considering the interference signal power contained in the signal output from the receiver 402. For instance, the threshold determiner 404 determines the interference signal power threshold as shown in FIG. 2. More specifically, the threshold determiner 404 measures the IoT using the signal fed from the receiver 402. When the threshold update period arrives, the threshold determiner 404 increases or decreases the interference signal power threshold by comparing the measured IoT with the first reference value or the second reference value. Herein, the first reference value is the sum of the IoT target threshold and the IoT hysteresis margin. The second reference value is the difference of the IoT target threshold and the IoT hysteresis margin.

The message processor 406 extracts control information from the signal output from the receiver 402 and outputs the extracted control information to the controller 408. For example, the message processor 406 extracts the downlink signal power (Received Signal Strength Indicator (RSSI)) information received from the serviced MS, and provides the downlink signal power to the controller 408. Herein, the downlink signal power information includes the signal power $RSSI_{MS\ for\ SBS}$ provided from the serving BS to the MS and the signal power $RSSI_{MS\ for\ NBS}$ provided from the neighbor BS to the MS.

The controller 408 controls operations of the BS.

The controller 408 controls the sending of the interference signal power threshold determined by the threshold determiner 404, to the neighbor BSs through the wired interface 412.

Figure 5:
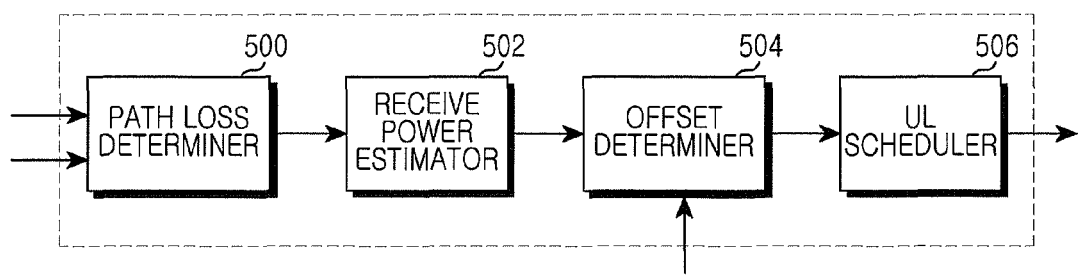
FIG. 5 illustrates the base station in detail according to an embodiment of the present invention.

When the transmit power update period of the MS arrives, the controller 408 controls the transmit power of at least one serviced MS by taking account of the interference signal power threshold provided from at least one neighbor BS via the wired interface 412. For example, the controller 408 controls the transmit power of the serviced MS as shown in FIG. 3. Herein, the controller 408 can be constructed as shown in FIG. 5.

The transmitter 410 encodes and converts data and a control message to send to the serviced MS, to an RF signal and outputs the RF signal to the duplexer 400. The transmitter 410 transmits the transmit power control information of the serviced MS under the control of the controller 408. For example, when the controller 408 determines the transmit power offset based on Equation 11, the transmitter 410 sends the transmit power offset $TxPowerAdjust_{MS_i}$ determined by the controller 408 to the corresponding MS. For example, when the controller 408 limits the available transmit power of the MS based on Equation 12, the transmitter 410 sends to the corresponding MS the resource allocation information corresponding to the limited transmit power.

The transmitter 410 can include a channel coding block, a modulating block, and an RF processing block. Herein, the channel coding block includes a modulator, an interleaver, a channel encoder, and so on. The modulating block includes an Inverse FFT (IFFT) operator for mapping the signal output from the channel coding block to subcarriers. The RF processing block converts the baseband signal output from the modulating block to an RF signal and outputs the RF signal to the duplexer 400.

The wired interface 412 sends and receives signals to and from at least one neighbor BS over the backhaul. For instance, the wired interface 412 sends the interference signal power threshold determined by the threshold determiner 404 to at least one neighbor BS under the control of the controller 408. The wired interface 412 receives the interference signal power threshold determined by the neighbor BS and the transmit power information of the neighbor BS, from at least one neighbor BS.

The BS includes a storage, which is not illustrated in the drawing, for storing the interference signal power threshold and the transmit power information of the neighbor BS received via the wired interface 412.

FIG. 5 is a detailed block diagram of the BS according to an embodiment of the present invention.

The controller 408 includes a path loss determiner 500, a receive power estimator 502, an offset determiner 504, and a UL scheduler 506 as shown in FIG. 5.

The path loss determiner 500 determines the path loss $Pathloss_{MS_i\ for\ SBS}$ between the MS and the serving BS and $Pathloss_{MS_i\ for\ NBS}$ between the MS and the neighbor BS. For example, the path loss determiner 500 determines the path loss $Pathloss_{MS_i\ for\ SBS}$ between the i-th MS and the serving BS using the transmit power of the serving BS and the downlink signal power $RSSI_{MS_i\ for\ SBS}$ received from the serving BS to the i-th MS based on Equation 4. The path loss determiner 500 determines the path loss $Pathloss_{MS_i\ for\ NBS}$ between the i-th MS and the neighbor BS using the transmit power of the neighbor BS and the downlink signal power $RSSI_{MS_i\ for\ NBS}$ received from the neighbor BS to the i-th MS based on Equation 5.

The receiver power estimator 502 predicts the receive power of the neighbor BS using the path loss of the MS provided from the path loss determiner 500. For instance, the receive power estimator 502 predicts the receive power of the neighbor BS using Equation 6 or Equation 7. The receive power of the neighbor BS indicates the signal strength received to the neighbor BS from the MS.

The offset determiner 504 determines the transmit power offset of the MS using the receive power of the neighbor BS predicted by the receive power estimator 502 and the interference signal power threshold provided from the neighbor BS via the wired interface 412. For example, the offset determiner 504 determines the transmit power offset of the corresponding MS by considering the interference for the k-th neighbor BS based on Equation 8. Next, the offset determiner 504 determines the transmit power offset of the i-th MS based on Equation 9 such that the transmit power offset of the i-th MS does not fall below the minimum transmit power offset. The offset determiner 504 repeatedly determines the transmit power offset of the i-th MS (the steps 317 through 321) until the step 315 of FIG. 3 is satisfied. The offset determiner 504 determines the transmit power offset of the i-th MS based on Equation 10 such that the transmit power offset of the i-th MS does not exceed the maximum transmit power offset.

The offset determiner 504 repeats the above-stated operations until the BS determines the transmit power offset for every serviced MS.

The UL scheduler 506 controls the transmit power for each individual MS through the uplink scheduling by considering the transmit power offset of the serviced MS determined by the offset determiner 504. For example, the UL scheduler 506 determines the transmit power offset of the MS by subtracting the transmit power offset determined by the offset determiner 504 from the accumulated transmit power offset for the MS based on Equation 11. For example, the UL scheduler 506 limits the available transmit power of the MS with the transmit power offset determined by the offset determiner 504 based on Equation 12.

As set forth above, the BS of the wireless communication system determines the transmit power of the MSs by taking account of the transmit power threshold of the MS provided from the neighbor BS. Therefore, the system stability and the service quality can be improved by reducing the uplink interference exerted on the neighbor BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling uplink interference at a Base Station (BS) in a wireless communication system, the method comprising:
   determining at least one interference signal power threshold determined by at least one neighbor BS;
   determining a transmit power offset for at least one serviced Mobile Station (MS) using the at least one interference signal power threshold; and
   sending the transmit power offset for the at least one MS to the at least one MS,
   wherein determining the transmit power offset comprises:
      determining a path loss between the BS and the MS and a path loss between the neighbor BS and the MS;
      predicting a signal power when a transmit signal of the MS is received at the neighbor BS using at least one of the path loss between the BS and the MS and the path loss between the neighbor BS and the MS; and
      determining the transmit power offset of the MS using the predicted signal power and the interference signal power threshold determined by the neighbor BS.

2. The method of claim 1, wherein the at least one interference signal power threshold is determined by each neighbor BS by considering interference caused to the neighbor BS by at least one neighbor cell.

3. The method of claim 1, wherein the determining of the threshold comprises:
   receiving an interference signal power threshold determined by each neighbor BS from the at least one neighbor BS over a backhaul.

4. The method of claim 1, further comprising:
   when there are at least two neighbor BSs around the MS, repeating the determining of the path loss step, the predicting of the signal power step, and the determining of the transmit power step for each neighbor BS around the MS.

5. The method of claim 1, further comprising:
   when there are at least two MSs serviced, repeating the determining of the path loss step, the predicting of the signal power step, and the determining of the transmit power step for each serviced MS.

6. The method of claim 1, further comprising:
   selecting a greater one of the determined transmit power offset of the MS and a previously determined transmit power offset of the MS, as the transmit power offset of the MS.

7. The method of claim 6, wherein the previously determined transmit power offset of the MS is set to a minimum transmit power offset initially.

8. The method of claim 1, further comprising:
   selecting a smaller one of the determined transmit power offset of the MS and a maximum transmit power offset, as the transmit power offset of the MS.

9. An apparatus for controlling uplink interference at a Base Station (BS) in a wireless communication system, the apparatus comprising:
   an interface configured to communicate with at least one neighbor BS;
   a receiver configured to receive a signal from a Mobile Station (MS);
   a controller configured to determine a transmit power offset for at least one serviced MS using an interference signal power threshold determined by at least one neighbor BS and provided through the interface; and
   a transmitter configured to send the transmit power offset for the at least one MS determined by the controller, to the at least one MS,
   wherein the controller comprises:
      a path loss determiner configured to determine a path loss between the BS and the MS and a path loss between the neighbor BS and the MS;
      a receive power estimator configured to predict a signal power when a transmit signal of the MS is received at the neighbor BS using the path loss determined by the path loss determiner; and
      an offset determiner configured to determine the transmit power offset of the MS using the signal power predicted by the receive power estimator and the interference signal power threshold determined by the neighbor BS.

10. The apparatus of claim 9, wherein the interference signal power threshold is determined by each neighbor BS by considering interference caused to the neighbor BS by at least one neighbor cell.

11. The apparatus of claim 9, wherein, when there are at least two neighbor BSs around the MS, the controller is configured to control the path loss determiner to determine the path loss, control the receive power estimator to predict the signal power, and control the offset determiner to determine the transmit power offset of the MS, for each neighbor BS around the MS.

12. The apparatus of claim 9, wherein the controller further comprises:
   an uplink scheduler configured to control a transmit signal for the at least one MS through uplink scheduling by considering the transmit power offset of the at least one serviced MS determined by the offset determiner.

13. The apparatus of claim 10, wherein, when there are at least two serviced MSs, the controller is configured to control the path loss determiner to determine the path loss, control the receive power estimator to predict the signal power, and control the offset determiner to determine the transmit power offset of the MS, for each serviced MS.

14. The apparatus of claim 9, wherein the offset determiner is configured to determine the transmit power offset of the MS using the signal power predicted by the receive power estimator and the interference signal power threshold determined by the neighbor BS, and the offset determiner is configured to select a greater one of the determined transmit power offset of the MS and a previously determined transmit power offset of the MS, as the transmit power offset of the MS.

15. The apparatus of claim 14, wherein the previously determined transmit power offset of the MS is initially set to a minimum transmit power offset.

16. The apparatus of claim 9, wherein the offset determiner is configured to determine the transmit power offset of the MS using the signal power predicted by the receive power estimator and the interference signal power threshold determined by the neighbor BS, and the offset determiner is configured to select selects a smaller one of the determined transmit power offset of the MS and a maximum transmit power offset, as the transmit power offset of the MS.

17. The apparatus of claim 9, further comprising:

a threshold determiner configured to determine the interference signal power threshold by considering interference determined using a signal to receive through the receiver, wherein the interface is configured to send the interference signal power threshold determined by the threshold determiner, to at least one neighbor BS.

18. The apparatus of claim 17, wherein the interface is configured to receive an interference signal power threshold determined by each neighbor BS from the at least one neighbor BS over a backhaul, and send the interference signal power threshold determined by the threshold determiner to at least one neighbor BS.

* * * * *